United States Patent [19]
Luongo

[11] 3,785,148
[45] Jan. 15, 1974

[54] ELECTRONIC SYSTEM AND METHOD FOR OPERATING A STEAM TURBINE WITH INDEPENDENT OVERSPEED PROTECTION ESPECIALLY ADAPTED FOR A NUCLEAR REACTOR POWERED STEAM TURBINE

[75] Inventor: Michael C. Luongo, Brookhaven, Pa.

[73] Assignee: Westinghouse Electric Corporation, Pittsburgh, Pa.

[22] Filed: Oct. 14, 1971

[21] Appl. No.: 189,230

[52] U.S. Cl. .................................. 60/105, 60/73
[51] Int. Cl. ..................... F01k 13/02, F01k 17/02
[58] Field of Search ............................. 60/73, 105

[56] References Cited
UNITED STATES PATENTS

| | | | |
|---|---|---|---|
| 3,060,692 | 10/1962 | Caldwell et al. | 60/105 X |
| 3,097,488 | 7/1963 | Eggenberger | 60/105 X |
| 3,421,014 | 1/1969 | Moorganov | 60/105 X |

Primary Examiner—Martin P. Schwadron
Assistant Examiner—H. Burks
Attorney—F. H. Henson et al.

[57] ABSTRACT

In a steam turbine an overspeed protection system and method is provided which operates completely independently of the conventional steam valve controller or governor. Existing hydraulically actuated valves such as stop valves, governor valves, interceptor valves, etc., are deactivated by draining hydraulic control fluid from the aforementioned through the action of specially provided dump valves. A pair of dump valves is provided for each of the steam flow valves.

Three turbine speed sensing transducers operating independently provide signals which are translated through three corresponding check circuits into related overspeed check signals. The three resulting check signals relating to overspeed are translated through majority switching logic into two dump valve trip signals. Each set of such trip signals operates one of the pair of dump valves on each steam control valve.

64 Claims, 10 Drawing Figures

PATENTED JAN 15 1974           3,785,148

| STATE OF RELAYS | S | F |
|---|---|---|
| ALL SYSTEMS GO | ON | OFF |
| PROTECTION POWER FAILURE | OFF | OFF |
| OVERSPEED | OFF | OFF |
| SIGNAL DISCONTINUITY | ON | ON |

ELECTRONIC SYSTEM AND METHOD FOR OPERATING A STEAM TURBINE WITH INDEPENDENT OVERSPEED PROTECTION ESPECIALLY ADAPTED FOR A NUCLEAR REACTOR POWERED STEAM TURBINE

CROSS-REFERENCE TO RELATED APPLICATION

1. Overspeed Protection System For Steam Turbine Power Plant, Ser. No. 866,965, filed Oct. 16, 1969 now U.S. Pat. No. 3,643,437 by M. E. Birnbaum et al. and assigned to the present assignee.

2. Ser. No. 189,320, filed Oct. 14, 1971 entitled "General System and Method for Operating a Steam Turbine with Independent Overspeed Protection Especially Adapted for a Nuclear Reactor Powered Steam Turbine" by J. D. Conrad, Jr. et al.

3. Ser. No. 189,226, filed Oct. 14, 1971 entitled "System and Method for Operating a Steam Turbine with Independent Overspeed Protection Especially Adapted for a Nuclear Reactor Powered Steam Turbine" by J. D. Conrad, Jr. et al.

4. Ser. No. 189,322, filed Oct. 14, 1971 entitled "System and Method for Operating a Steam Turbine with Dual Hydraulic Independent Overspeed Protection Especially Adapted for a Nuclear Reactor Powered Steam Turbine" by M. Csanady, Jr. et al.

BACKGROUND OF THE INVENTION

In the prior art there exist many systems for preventing a turbine from developing an excessive speed. Protection against this eventually is extremely important especially where nuclear power is used to generate steam for a turbine. If the turbine should enter a runaway state, centrifugal forces can become so great that rotor discs rupture, causing the throwing of pieces of the rotor around a generating station. These flying pieces are referred to as missiles.

If the rotor of a typical turbine in a nuclear generating plant presently in operation would rupture, the missiles produced thereby could weigh from 50 pounds to several tons. These missiles emanating from the turbine, could pierce the reactor, pipes containing radioactive fluids or steam, the control mechanism for the reactor, etc. The piercing of the reactor or vessels and piping containing radioactive fluids may possibly allow radiation to be dispersed.

The Atomic Energy Commission has recognized the potential hazards involved in turbine accidents and has therefore promulgated stringent regulations in the design and construction of any nuclear generating plant requiring that the possibility of any accident occurring will be virtually zero. The regulations applicable to nuclear power plant construction are to be found in A.E.C. Regulations, Part 50, Appendix A.

The Atomic Energy Commission has promulgated the above-mentioned safety regulations for nuclear electric power generation plants because of the unique characteristics of nuclear reactors. Unlike fossil fuel reactors where the generation of steam can be terminated relatively quickly by cutting off the fuel supply to a steam generator, a nuclear reactor requires a complex and lengthy shutdown procedure. In order to stop the production of steam in a fossil plant, only the flow of boiler fuel such as gas, oil or coal need be stopped. The resulting shutdown and termination of the generation of steam can be completed in minutes. However, in the case of a nuclear reactor the shutdown procedure requires hours and tens of hours. Therefore, if a pipe or vessel carrying fluid is ruptured by a missile from the turbine, a hazardous condition caused by leaking material may continue for a long period of time until the reactor is shut down.

One solution to this problem of turbine missiles in a nuclear steam generating system was described in "Westinghouse Engineer" July 1966, pages 110 through 113 by Walter Sinton. Walter Sinton's solution to the problem is to provide covers for the reactor and steam turbines. The cover for the steam turbines confines any missiles therein. Unfortunately, in a commercial nuclear steam turbine system, the required size of a cover or shield strong enough to protect the plant from turbine missiles would have to be 6 to 10 ft. thick if made of concrete or 6 to 12 inches thick if made of steel. Such a shield would be extremely expensive, costing many millions of dollars, and require a completely redesigned foundation and building to house the turbine generating system. A shield of this size would also make maintenance, repairs and replacement of any parts in the turbine generator or reactor extremely difficult, time consuming and expensive.

Another solution which has been proposed for the protection of a nuclear plant against rotor missiles is to increase the thickness of the reactor walls and the case of the generator itself. This solution is unsatisfactory for the reasons enumerated above including high cost and extreme maintenance problems.

Another prior art approach is the building of high reliability against turbine overspeed into the existing turbine speed governor system itself. Inherent in the prior art speed governor solution to the problem of operating nuclear plants with turbine missile protection is that the overspeed protection system still remains part of the basic speed control mechanism. If a valve were to stick in the open position in a conventional overspeed system, the governor speed control system could not prevent turbine overspeed under no load or lightly loaded conditions. The compliance of this type of protection with AEC Regulations is, at this time, marginal.

Additionally the speed governor control systems of the prior art are operative in governing the speed of the turbine during operation. Therefore, these governor speed controls must be taken out of service in order to test their responsiveness to an overspeed condition. A system which is independent of the conventional governor speed controls is required which can be checked without disrupting the operation of the conventional speed system.

Therefore, a less expensive, highly reliable system which does comply with the Atomic Energy Commission Regulations is needed.

SUMMARY OF THE INVENTION

The present invention overcomes the limitations and disadvantages of the prior art by providing a power generation system and method for generating electricity which has completely independent protection against turbine overspeed runaway and turbine missiles.

Accordingly, it is a basic concept of the present invention to provide an electric power plant having a steam turbine and a completely independent turbine overspeed protection system. The independent overspeed protection system preferably includes means for dumping hydraulic fluid from the actuators of the various governor, interceptor, stop and throttle valves controlling the flow of steam to the turbine. Each valve preferably has two independent systems for dumping the hydraulic fluid and accomplishing a very fast shutdown of the turbine. These two independent systems can therefore be tested individually while the electrical generating system is on-line. In the preferred embodiment the signals for operating each of the two independent dumping systems for each valve are derived from three independent turbine speed signals. The three speed signals in three independent dual circuitry channels generate three independent electrical speed safe signals and three independent failure or signal discontinuity representing signals.

The three turbine speed safe signals are translated into a majority state signal indicating the mutual state of any of two out of the three speed signals. The three failure signals are translated into a majority state signal of any of two out of three failure signals.

A majority state safe signal is determined by switching logic, such that, if any two speed signals have proper predetermined values, a safe or majority state signal is indicated for the speed channels. The majority safe signal is directed to each of the two independent protection systems attached to each valve actuator. Therefore, if two of the three speed signals and two of the three failure signals have proper predetermined values, the dump values remain closed. If, however, two of the three speed signals or two of the three failure signals do not have the proper predetermined values, the dump valves open, shutting down the system.

The circuitry and operation of any one of three speed safe and three failure channels can be tested independently while the power generating system and protection circuitry are on line and without disrupting the operation of the system or circuitry. Any one speed channel can therefore fail or be under test without shutting down the system. As an added reliability feature, if one speed channel is under test, and another channel fails, the electrical generating system will be shut down since a test signal acts like a malfunction signal.

DESCRIPTION OF THE PREFERRED EMBODIMENT

Figure 1:
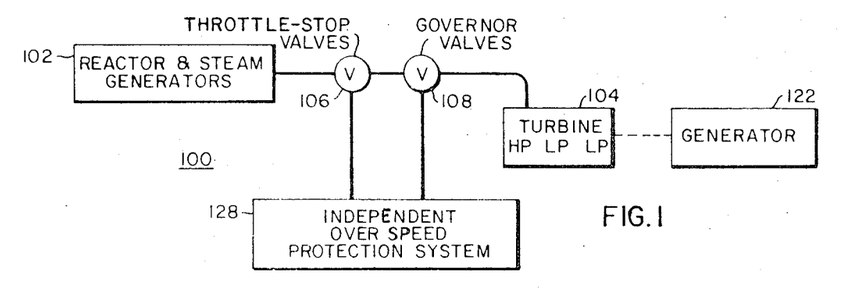
FIG. 1 illustrates a nuclear electrical power generating system as defined by the present invention.

Reference is now made to FIG. 1 where a nuclear reactor system and turbine 100 are shown. The nuclear reactor system and turbine 100 include a reactor 102 and a steam generator 103, which provides steam for a turbine 104. Steam from the steam generator 103 passes through a stop valve 106 and a governor valve 108 before flowing into the turbine 104.

Figure 1A:
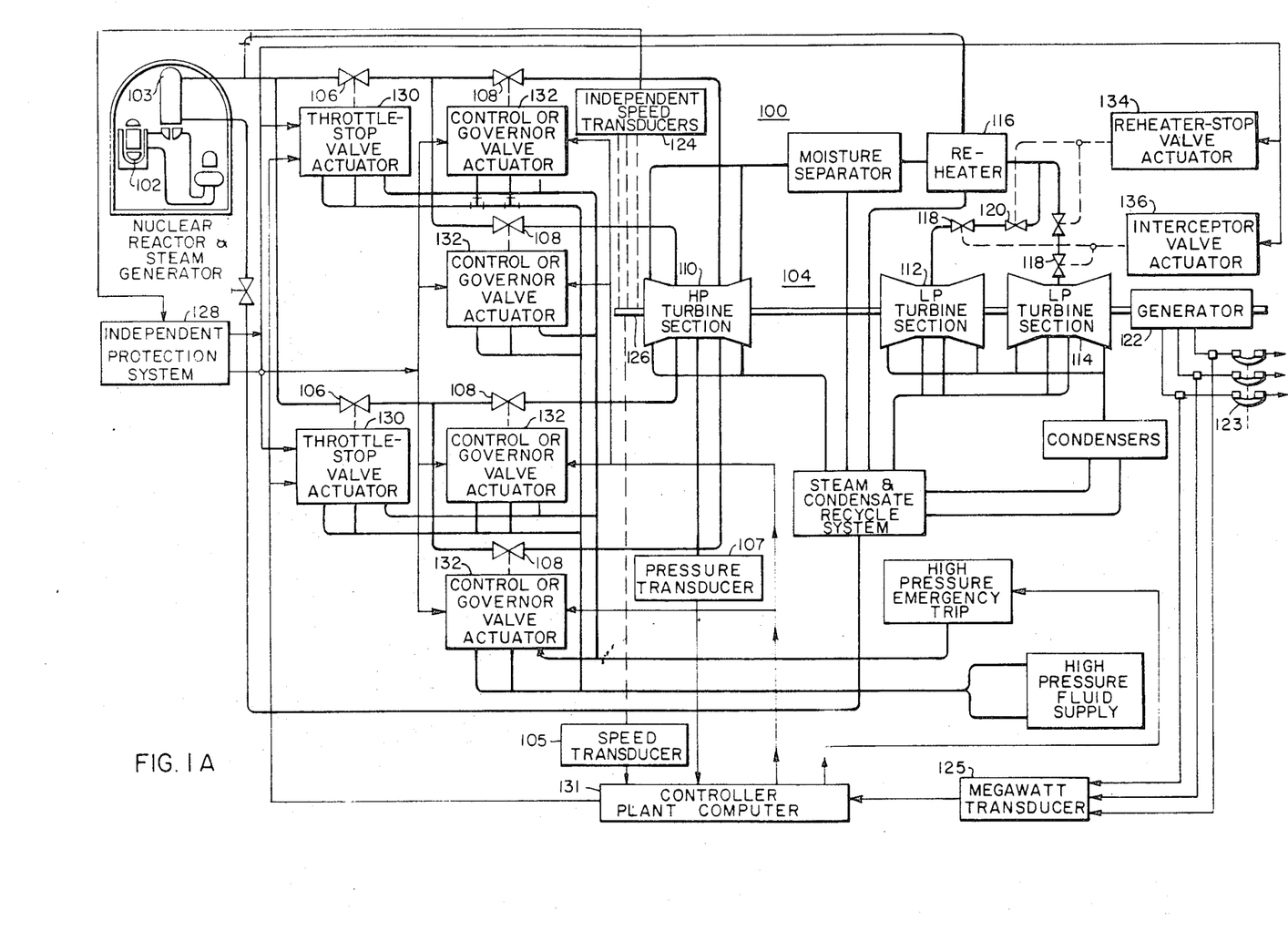
FIG. 1A illustrates a more detailed application of the invention to a nuclear steam turbine system.

Referring now to FIG. 1A, the steam turbine 104 includes a high pressure turbine (H.P.) 110 and two low pressure sections (L.P.) 112 and 114 with an appropriate reheater 116 and reheater-stop valves 120 and interceptor valves 118 connected thereto. The turbine system 104 drives a generator 122 which produces electricity. A breaker 123 is connected between the generator 122 and a load, not shown. A megawatt transducer 125 is connected to the generator 122. The megawatt transducer 125 is connected to a controller which in this case includes a plant digital computer 131 having an output connected to throttle-stop valve actuators 130, control or governor valve actuators 132, reheater stop valve actuators 134 and interceptor valve actuators 136.

The reactor 102 in the present embodiment, is of the pressurized water reactor type (P.W.R.). Other reactor types, such as a boiling water reactor, would fall within the scope of the invention.

A speed transducer 105 is coupled to the turbine shaft to sense the speed of the steam turbine 104. An output signal from the speed transducer 105 is fed into an input of the controller and plant digital computer 131. The plant controller and computer 131 provides signals for each of the valve actuators 130, 132, 134 and 136 which control the positions of associated valves 106, 108, 118 and 120, and thereby control the speed and/or load of the turbine 104. The speed of the turbine 104 is monitored by the speed transducer 105 and fed back to the controller and plant computer 131.

During startup of the turbine system 104 the throttle-stop values 106 are variably positioned by the controller and plant computer 131 thereby allowing for speed control of the turbine system 104. The throttle-stop valves 106 act as safety valves being either fully open or closed during synchronous operation. The governor valves 108 modulate the flow of steam through the high pressure turbine 110. The reheater stop valves 120 are either fully open or fully closed. The interceptor valves 118 are usually fully open or fully closed, however, under certain conditions of operation they modulate the steam flow such as during turbine shutdown.

In normal operations signals from the speed transducer 105, a pressure transducer 107 and the megawatt transducer 125 are used in the controller and plant computer 131 for computing positions of the throttle-stop valves 106, the control or governor valves 108, the reheater stop valves 120 and the interceptor valves 118 needed to satisfy turbine load and/or speed demand. The controller and plant computer 131 transmits signals indicative of the valve positions to the respective valve actuators 130, 132, 134 and 136.

The controller and plant computer 131 in the preferred embodiment is an analog computer. The analog computer designated as an Electrohydraulic System is described in Westinghouse Electric Corp. Bulletin No. 139,132, file No. 1005M. An Electrohydraulic System presently being used on Westinghouse Electric Corporation turbine systems is an example of an analog controller and (plant computer) usable in the present embodiment. Computer or automatic control provides for much more efficient and rapid control of the turbine 104 than manual or partially automatic control could provide. In an alternative embodiment the controller and plant computer 131 would be a digital computer programmed to perform the function of the Electrohydraulic System.

In the event of a computer or other system failure the turbine may start accelerating out of control bursting the rotor and producing missiles which could destroy the reactor 102, the turbine 104, piping, the building and injuring personnel and resulting in leakage of radioactive materials.

In order to prevent missiles from destroying the generating system an independent protection system 128 includes a speed transducer assembly 124 which is independent of the speed transducer 105 and which is also connected to a shaft 126 of the turbine 104. The independent speed transducer assembly 124 and the protection system 128 are independent of the controller and plant computer 131. If the controller and plant computer 131 or any system connected thereto should fail and an overspeed condition should result, missile generation will be prevented by the independent protection system 128.

Figure 1B:
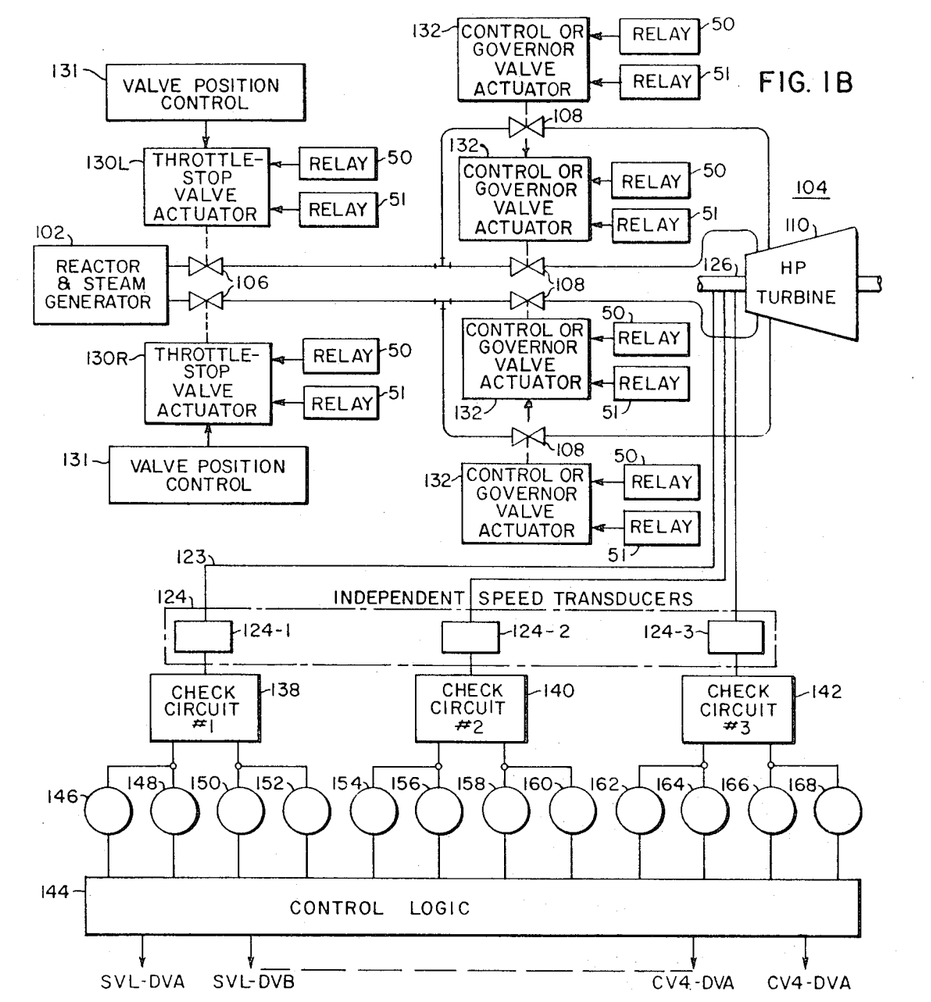
FIG. 1B shows the independent turbine speed protection system.
Figure 2:
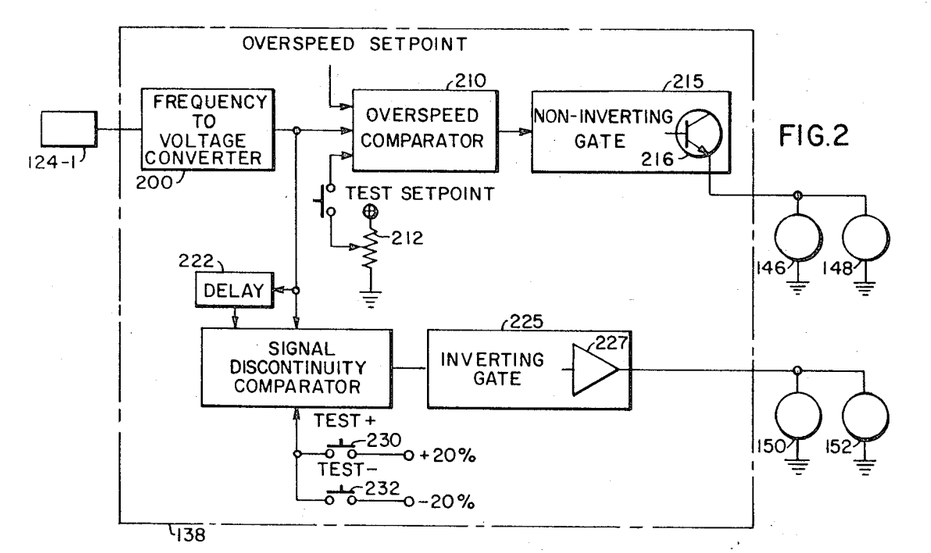
FIG. 2 is a block diagram of a suitable check circuit which is used in the preferred embodiment of schematic diagram shown in FIG. 2A.

An output of the independent speed transducer assembly 124 is connected to the independent overspeed protection system 128 which in turn controls the valve actuators 130, 132, 134 and 136. The independent speed transducer 124 may be of the magnetic type such as described in U.S. Pat. Nos. 3,018,381 and 3.018,382 assigned to the assignee of the present invention. In the protection system, the output signals of the three transducer parts 124-1, 124-2, 124-3 of the independent speed transducer assembly 124 (FIG. 1B) are applied to check circuits 138, 140 and 142, respectively. The circuit details of the check circuits 138, 140 and 142 are shown in FIG. 2 and are described infra. As an alternative embodiment, the check circuits 138, 140 and 142 as well as their control logic, described infra, can be implemented by a digital computer program. The digital computer may be the same as the plant computer 131 thereby realizing considerable savings in hardware expenses; however, with a decrease in operating efficiency.

The check circuits 138, 140 and 142 compare the signal from the independent speed transducers 124-1, 124-2 and 124-3, to a signal representing a predetermined value of speed to determine whether the speed of the turbine 104 is being maintained at a predetermined level. Each of the check circuits 138, 140 and 142 generates two signals, one indicating a failure of the turbine 104 to maintain the predetermined angular velocity and another signal to indicate that the angular velocity is within the limits of the predetermined value. By use of the two signals not only is the turbine 104 monitored for overspeed but any abrupt change in the speed signal is monitored which could indicate a failure of the independent overspeed protection system 128 or a catastrophic failure of the turbine 104. The output terminals of the check circuits 138, 140 and 142 are connected to control logic circuitry 144, to be described infra in reference to FIG. 4. In the present embodiment switching circuits or relays 146 through and including 168 are connected between the check circuits 138, 140 and 142 and the control logic circuitry 144.

The relays 146 and 148 are controlled by the check circuit 138; the relays 154 and 156 are controlled by the check circuit 140; and the relays 162 and 164 are controlled by the check circuit 142 to control paths in the control logic circuitry 144. The relays 146, 148, 154, 156, 162 and 164 during the normal operation of the system with power on, are in the actuated or "ON" state. In the event of the detection of an overspeed condition by any one or more of the check circuits 138, 140 and 142, the switching elements or relays 146, 148, 154, 156, 162 and 164 are called safe or overspeed signal channels.

The switching elements or relays 150, 152, 158, 160, 166 and 168 are connected to operate in an analogous fashion generating discontinuity or failure signals when a speed signal discontinuity has been determined. The circuits connected to and including the relays 150, 152, 158, 160, 166 and 168 are called discontinuity or failure signal channels. Each safe or overspeed channel, e.g., including relays 146 and 148, and each discontinuity or failure channel, e.g., including relays 150 and 152, comprise the two parts of the dual channel connected to and controlled by the check circuit 138. The relays 154, 156, 158 and 160 form the dual channel connected to and controlled by the check circuit 140; and the relays 162, 164, 166 and 168 form the dual channel connected to and controlled by the check circuit 142.

In the event that the speed of the turbine 104 equals or exceeds a predetermined value, in this case 111 percent of the synchronous speed, an overspeed condition is signaled by the transducer assembly 124 and the overspeed relays 146 and 148 connected to check circuit 138, overspeed relays 154 and 156 connected to check circuit 140 and the overspeed relays 162 and 164 connected to the check circuit 142 drop out or enter the "OFF" state. The failure or discontinuity detection relays 150, 152, 158, 160 and 168 are normally in the "OFF" state when no discontinuity or system failure condition exists. If the electronic systems are not operating properly, the relays 150, etc., are energized, or placed in the "ON" state, thereby indicating a signal failure or discontinuity. If the speed of the turbine 104 equals or exceeds 111 percent of synchronous speed an overspeed condition is signaled and the overspeed or safe relays 146, 148, 154, 156, 162 and 164 change or reverse state, thereby generating a signal indicating an overspeed condition. The overspeed signal actuates the dump valves described infra which prevent turbine overspeed and the generation of turbine missiles.

Referring now to FIG. 2, the internal circuitry of the check circuit 138 is shown. The check circuits 140 and 142 also have the same internal circuitry. A signal from the independent speed transducer 124-1 is applied to a frequency-to-voltage converter 200. The output signal of the frequency-to-voltage converter 200 is applied to an overspeed comparator 210 and to a signal discontinuity comparator 200 and a delay circuit 222. An output of the delay circuit 222 is connected to an input of the signal discontinuity comparator 220. An output of the signal discontinuity comparator 220 is connected to an input of an inverting gate 225.

The frequency-to-voltage converter 200 is typically a monostable multivibrator triggered by the zero crossover of the input signal thereto from the A.C. speed transducer 124-1. The monostable multivibrator has a constant duration in the unstable state. The output signal from the monostable multivibrator will therefore have a variation in duty cycle which will be proportional to the frequency of the input signal thereto. The output signal from the monostable multivibrator is rectified and filtered thereby producing a D.C. voltage output which is linearly proportional to the input frequency from transducer 124-1.

Figure 2A:
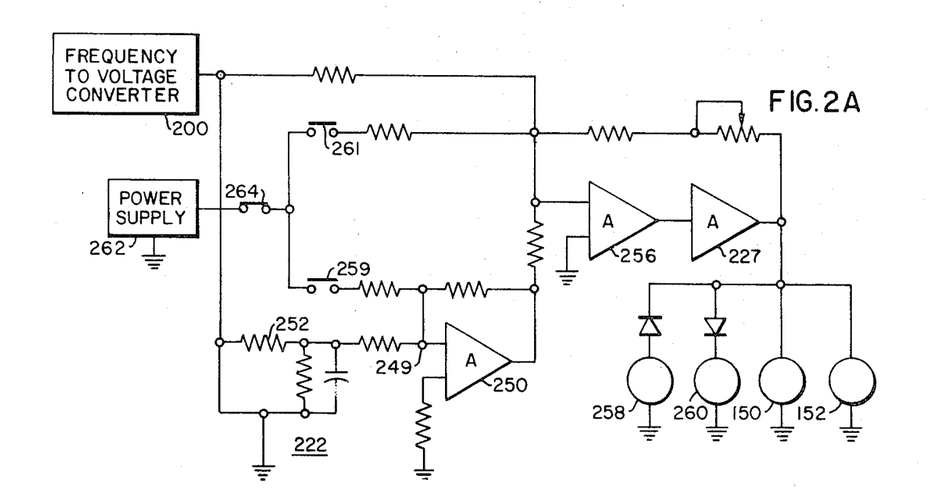
Figure 3:
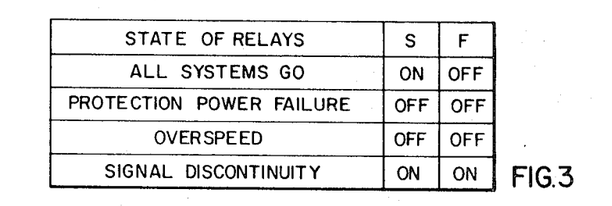
FIG. 3 is a chart which summarizes the states of the speed channel and the failure channel relays for various operating conditions of a typical system.

The signal discontinuity comparator 220, the delay circuit 222 and the inverting gate 225 and the power amplifier 227 are shown in greater detail in FIG. 2A. The output signal from the frequency to voltage converter 200 is connected to an input 249 of amplifier 250 through an appropriate impedance circuit 252. The output signal from the frequency-to-voltage converter 200 is connected to the delay circuit 222 where it is fed through appropriate impedance 252 and delayed for summation at the input 249 of the amplifier 250 with the original signal from the converter 200. The delay circuit 222 in the preferred embodiment has a delay of 1.4 seconds.

The time constant of 1.4 seconds is chosen so that any normal changes in the speed signals of the turbine system will be filtered out. Only signal discontinuities and signals representing catastrophic failure will be passed through the signal discontinuity comparator 220. If the output signal from the frequency-to-voltage converter 200 which is proportional to turbine speed varies slowly, the output signal of the amplifier 250 will remain at zero. However, if the signal from the frequency to voltage converter 200 varies rapidly, the output signal of the amplifier 250 either swings positive or negative. The output signal from the amplifier 250 is amplified by an amplifier 256 and the amplifier 227. When a signal appears at the output of the amplifier 227, either relay 258 or relay 260 will be energized through diode directed paths. When either relay 258 or 260 is energized one of respective contacts 259 or 261 connects a positive power supply 262 to the input of the amplifier 256 thereby generating an output from the amplifier 227 to lock and hold the circuit in the last state. In order to reset the circuit for renewed operation a reset button 264 is provided which breaks the circuit of contact 259 or 261 thereby reducing the output signal of the amplifier 227 to zero.

In other embodiments of the invention, various modifications can be made in the arrangement described herein. For example, the frequency signal provided by the speed detector device 124-1 can be converted to a digital representation and then compared by means of a digital computer or other digital means to a suitable digital setpoint.

Referring again to FIG. 2, in the preferred embodiment, the setpoint of the overspeed comparator 210 may be tested by applying a variable voltage derived from a potentiometer 212, thereby determining whether or not the check circuit 138 functions properly in the release of the relays 146 and 148. The power control of the relays 146 and 148 is handled by a noninverting gate 215, which includes an emitter follower transistor stage 216. The transistor stage 216 is cut off from conduction in the event of an overspeed detection by the comparator 210, resulting in the dropping out of the relays 146 and 148. Thus, with a majority logic, which will be discussed in detail infra, the operation of the check circuits 138, 140 and 142 may be tested to insure their proper operation under actual system overspeed conditions without causing any disruption in generating system operation. With one of the check circuits 138, 140 and 142 under test, an overspeed signal or discontinuity signal together with the test signal will act as if two of the dual channels indicated overspeed or discontinuity signals thereby shutting down the electric generation system and preventing generation of missiles. The very high reliability of the protection system 128 is maintained even under test conditions.

Although relays are referred to herein as providing suitable means for the switching logic of the invention, other devices such as solid state switching elements, logic gates, flip-flops or programmed computers may be used without departing from the spirit or practice of the invention.

The signal discontinuity comparator 220 is biased so that if the difference between the directly applied signal from the frequency-to-voltage converter 200 and the signal from the delay circuit 222 exceeds a predetermined value an electrical discontinuity condition is signaled. Test buttons 230 and 232 test the signal discontinuity comparator 220 by applying voltages to the signal discontinuity comparator 220. If either test button 230 or 232 is depressed, the comparator 220 is designed such that a signal is transmitted which turns on or picks up the relays 150 and 152. However, because of the majority of two out of three logic, to be described in greater detail infra, the generating system is not shut down.

Figure 4:
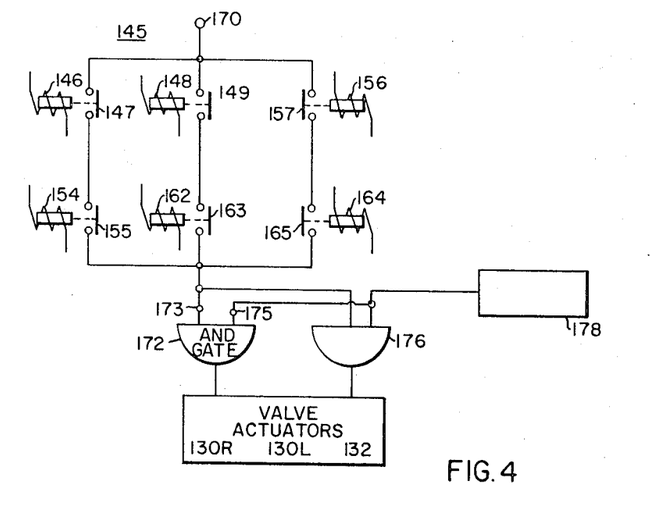
FIG. 4 provides a relay mechanization and logic for one solenoid channel.

Referring to FIG. 4, the majority logic is shown in detail as implemented in a majority circuit 145, and the checking circuit output relays 146, 148, 154, 156, 162 and 164 are shown with respective contacts in each relay being 147, 149, 155, 157, 163 and 165. In other words, the relay contact for the relay 146 is the contact 147, etc. The relay contacts in FIG. 4 are shown in their normally open deenergized position. In operation, the relays of FIG. 4 are energized and the contact closed. With all the relays energized, a voltage source at the input terminal 170 will be connected to an input terminal 173 of conventional AND gate 172, contained in the control logic box 144 in FIG. 1. A conventional AND gate requires all inputs to be energized in order for an output signal to be maintained. Referring again to FIG. 1B, and assuming that the check circuit 138 deenergizes the relays 146 and 148, the relay contacts 147 and 149 will open. However, the voltage signal at the input terminal 173 of the AND gate 172 will still retain its former value because the relay contacts 157 and 165 remain closed. The majority function is thereby performed since two of the three channels controlled by the check circuitry 138, 140 and 142 must indicate an overspeed condition. Therefore, the failure of only one channel will not trip the turbine system. However, if in addition, the check circuit 140 deenergizes the relays 154 and 156 connected thereto, the relay contacts 155 and 157 would also open. In this latter case, all three branches of the relay circuit 174 in FIG. 4 would be open, and the signal at an input of the AND gate 172 would be zero.

The other input 175 to AND gate 172 is connected to relay switching logic of the checking circuit output relays 150, 152, 158, 160, 162 and 168 in an appropriate fashion in order to provide an input signal to the AND gate 172 as long as two out of the three check circuits 138, 140 and 142 provide the appropriate output signals.

The AND circuit 172 provides one of the inputs to one of the dump valves of each of the valve actuators 130L, 130R and 132, to be described in greater detail later herein. Therefore, one dump valve on each of the valve actuators 130, 132, 134 and 136 is tripped, draining hydraulic fluid from the valve actuators 130, 132, 134 and 136 and closing the valves to the turbine 104 thereby preventing a turbine runaway and the generation of missiles which could destroy the generation system 100.

A similar conventional AND circuit 176 is connected to a similar majority circuit 178 performing the same function for each of the other dump valves connected to each of the valve actuators 130, 132, 134 and 136.

The functions of the relays 146 through 168 may also be accompanied by solid state switching circuitry or by digital logic or a digital computer. The function of the check circuits 138, 140 and 142 and the relays 146 through 168 may in alternative embodiments be included in the program of the plant digital computer, thus integrating the total system operation.

Figure 4A:
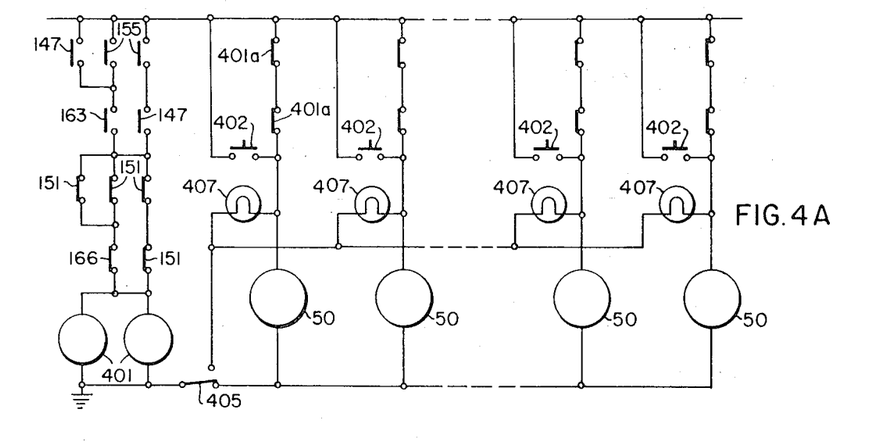
FIGS. 4A and 4B provide specific relay mechanization for the two independent dump channels, respectively, to provide appropriate majority switching controls.

Referring now to FIG. 4A, the majority logic circuitry 145 associated with the valves 130 and 132 is shown in an alternative embodiment. The relay contacts 147, 151, 155, 163 and 166 are shown connected in a series parallel combination thereby performing the operation of the AND gates 172 and 176 of FIG. 4. The relay logic combination actuates two relays 401 for purposes of redundancy. Contacts 401a of the relays 401 are connected in series in order to minimize the possibility of the welding shut of one relay contact from disabling the system.

Figure 4B:
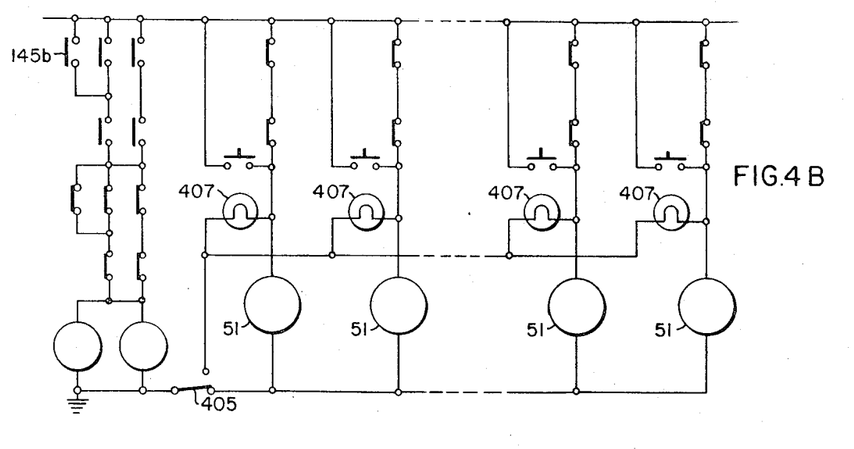

A test relay 405 is provided which disconnects the coils of dump valve solenoids 50 mounted on the valve actuators 130, 132, 134 and 136 and connects the indicator lights 407 to ground. Pushbuttons 402 are provided in order to test the continuity and operation of the circuitry connected to the dump valve solenoids 50. The indicating lights 407 are connected to the relay 405 in order that a continuous path for test purposes is provided for the pushbutton circuits 402 connected across the relay contacts 401a of the relays 401. In FIG. 4B there is shown an identical circuit 145b for the other dump channel which actuates the second dump valve in each of the valve actuators 130, 132, 134 and 136.

Figure 5:
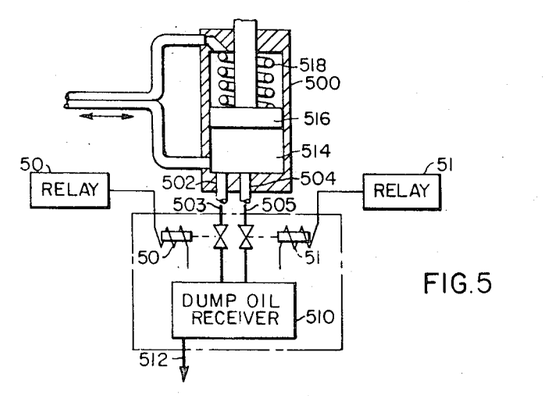
FIG. 5 shows a section through a steam valve actuator to show the manner in which the dump valves of the preferred embodiment are employed in a typical application.

Referring now to FIG. 5, a schematic diagram of the dump valves 506 and 508, connected to a typical valve actuator such as one of the valve actuators 132, 134 and 136, is shown. A valve actuator cylinder 500 with two ports 502 and 504 is also shown. The ports 502 and 504 are connected by tubing 503 and 505 to the two dump valves 506 and 508. The output side of the dump valves 506 and 508 are connected to a dump oil receiver 510. Dump oil 514 is discharged through a vent 512. When an overspeed condition in the turbine 104 occurs, the solenoids 50 and 51 are actuated thereby opening the dump valves 506 and 508 and the oil 514 is dumped at a very rapid rate from under the piston 516 into the dump oil receiver 510. A spring 518 returns the piston and the valve connected thereto to a closed position very rapidly to close the associated steam valve. Dump valves similar to the dump valves 506 and 508 dump the oil from all the actuators 130, 132, 134 and 136 and thereby closing the valves 106, 108, 118 and 120. With dump operation, the steam flow in the turbine 140 is cut off very quickly thereby preventing an overspeed condition from rupturing the turbine rotor and throwing missiles which could cause extensive damage to the entire generating and reactor system. Specific details as to a preferred form of turbine steam valves as well as apparatus suitable for hydraulic control are found in U.S. Pat. Nos. 3,152,601 and 3,169,451 assigned to the assignee of the present invention.

In order to prevent a runaway overspeed condition valves 106, 108, 118 and 120 are all closed as quickly as possible by the independent protection system 128. The steam generated by the reactor and steam generator 103 as shown in FIG. 1A is vented to the atmosphere such as by a vent connected to a secondary steamline.

In summary, to prevent overspeed runaway of the turbine 104 with the possible resultant rupture of the rotor and the throwing of missiles which could seriously damage the reactor 102 and injure personnel, an overspeed protection system 123 is provided which is independent of the turbine system for normal speed control comprising the speed transducer 105 and the controller and plant computer 131. Taking over the control of the turbine 104 during overspeed conditions which could lead to a runaway and the destruction of an entire generation station, the overspeed protection system 123 obviates the shortcomings of the prior art.

The turbine 104 is provided with three independent speed transducers 124, which generate three independent speed signals. These three signals are then translated through the use of appropriate logic circuitry into two signals which actuate the dump valves and allow the rapid closing of the steam control valves thereby foreclosing the possibility of disastrous overspeed runaway. Because of the majority logic for sensing the three independent speed signals, any one speed or failure channel can be tested independently without disrupting the turbine system. Thus, the present invention provides a high degree of assurance that when the dump valves are actuated, an actual verified overspeed or signal failure has occurred which warrants such drastic action; and further makes the performance tests possible during short periods of time to determine whether or not the individual check circuits are operating properly.

Even though a governor valve 108 may be stuck open, the stop valves 106, interceptor valves 120, and the control valves 118 will close and prevent an accident.

I claim as my invention:

1. An electric power generation system comprising:

a steam turbine system having means for generating steam, at least one high pressure and at least one low pressure turbine, a generator rotated by said turbine, means for valving a flow of steam through said steam turbine system, means for actuating said valving means, means for controlling said actuating means whereby position of said valving means is controlled, first means for sensing the magnitude of the rotational velocity of said steam turbine system, said first sensing means feeding signals to said controlling means, second means for sensing the magnitude of the rotational velocity of said steam turbine system, said second sensing means including a plurality of channel means, means for determining whether a predetermined number of said channel means have representations of turbine system conditions corresponding to predetermined conditions, said means for determining including second means for determining whether a predetermined number of channel means have representations of rotational velocity exceeding a predetermined rotational velocity limit, said channel means including failure channel means and safety channel means whereby a safe condition representation exists in said safe channel means and a safe condition representation exists in said failure channel means whenever the rotational velocity of said turbine system does not exceed said predetermined rotational velocity, and means for deactivating one or more of said actuating means upon the determination by said determining means whether a predetermined number of said channel means have representations of conditions corresponding to predetermined conditions whereby said deactivating means deactivates said actuating means and said actuating means closes said valving means thereby stopping the flow of steam through said turbine system.

2. The system of claim 1, wherein said actuating means includes at least two independent means for rapidly closing said valving means.

3. The system of claim 2, wherein said determining means includes means for detecting any discontinuity in the representation of turbine conditions such that any such malfunction is determined.

4. The system of claim 3, wherein said means for determining has a power supply, said means for determining includes means for detecting a failure in said power supply to said determining means thereby activating said means for deactivating said actuating means.

5. The system of claim 4, wherein said deactivating means includes at least two independent means for rapidly closing said valving means.

6. The system of claim 5, wherein said determining means includes means for detecting any discontinuity in the representation of turbine conditions such that any such malfunction is determined.

7. The system of claim 6, wherein said means for actuating said means for valving is operated by hydraulic fluid and said actuating means includes at least two dump valves associated with each of said actuating means, each dump valve being controlled by said deactivating means and actuating such that said hydraulic fluid is drained from said actuating means whereby said valving means is rapidly closed thereby stopping the flow of steam through said turbine system.

8. The system of claim 7, wherein said means for detecting any discontinuity includes delay means and comparator means whereby said discontinuity is detected by a comparison of a delayed representation of said rotational velocity of said turbine from said delay means differenced in said comparator means from the representation of said velocity without delay as related to a second predetermined rotational velocity limit.

9. The system defined in claim 8, wherein means are provided for testing the operation of said determining means by simulating the exceeding of said limits of said predetermined conditions such that none of said actuating means is activated by said deactivating means.

10. A nuclear electric power generation system comprising:

a nuclear reactor;

a steam turbine system having at least one high pressure and at least one low pressure turbine, a generator rotated by said turbine, breaker means connected between said turbine and an electrical load, valves for varying a flow of steam through said steam turbine system, hydraulically controlled actuators for operating said valves, means for transducing the rotational velocity of said steam turbine system into an electrical signal, said transducing means having at least three signal channels, first determining means for checking a signal in said signal channels to determine whether a predetermined rotational velocity has been exceeded, second means for determining whether at least two of said channel signals do not fulfill specific predetermined conditions, third means including means for activating at least two dump valves connected to hydraulic cylinders in each of said hydraulic actuators for dumping hydraulic fluid whereby upon actuation of said dump valves said hydraulic actuators close said valves very rapidly.

11. The system as defined in claim 10, wherein said second means includes circuitry for translating at least three of said signal channels into at least two independent dump signal channels for activating said dump valves independently.

12. A nuclear electric power generation system comprising:

a steam turbine system having at least one high pressure and at least one low pressure turbine, a generator rotated by said turbine system, a breaker connected between said generator and an electrical load, valves for regulating a flow of steam through said steam turbine system, means for actuating said valves, said actuating means having hydraulic actuator cylinders, means for protecting said nuclear reactor power generation system, means for transducing the rotational velocity of said steam turbine system into an electrical signal, said transducing means having three signal channels, means connected to said three channels for determining whether the signals in two of said three channels do not correspond to predetermined conditions, said determining means including two separate dump channels, said dump channels being activated when said determining means determines whether two of said three signal channels do not correspond to said predetermined conditions, said separate dump channels connected to solenoids of two separate dump valves on each of said actuators for dumping said hydraulic cylinder whereby each set of said solenoids of said dump valves, one on each of said actuators, is actuated independently by a dump channel signal.

13. A method of preventing turbine overspeeds in a steam turbine generating system resulting from partial or total load losses, said steam turbine generating system comprising at least one high pressure turbine, at least one low pressure turbine and control, interceptor throttle-stop, and reheater-stop valves associated therewith, an electrical generator rotated by said turbines, a breaker connected between said generator and an electrical load, actuators for actuating said valves, a transducer for transducing the rotational velocity of said steam turbine into an electrical signal, said transducer providing a plurality of independent speed signals, a signal channel for each speed signal, a check circuit included in each signal channel, control logic connected to said signal channels, two dumping signal channels including two separate dump valves independently actuated and connected to said actuators for dumping hydraulic fluid contained in said actuators, including the steps of:

transducing the speed of said turbine into a plurality of independent electrical signals;

checking said signals against predetermined conditions;

determining whether a predetermined number of said signals check against said predetermined conditions of the immediately preceding step.

14. The method of claim 13 including the additional step of:

activating each of said dump valves upon determining whether a predetermined number of said signal channels do not correspond to said predetermined conditions.

15. The method as defined in claim 14 including the additional step of:

dumping the hydraulic fluid from each of said hydraulic actuators.

16. The method as defined in claim 15 including the additional step of:

actuating each of said separate dump valves on each of said actuators using an independent signal derived from said control logic.

17. The method as defined by claim 16 including the additional step of:

testing each of said signal channels independently.

18. The method as defined by claim 17 including the additional step of:

testing each dump valve channel separately.

19. An overspeed protection system for a steam turbine comprising:

means for valving a flow of steam through said steam turbine, means for actuating said valving means, means for sensing the rotational velocity of said steam turbine system, said sensing means including sensing channel means, means for determining whether a predetermined number of channel means have representations of turbine system conditions corresponding to predetermined conditions, said channel means includes failure channel means and safety channel means whereby a safe condition representation exists in said safe channel means and a safe condition representation exists in said failure channel means whenever the rotational velocity of said turbine system does not exceed said predetermined rotational velocity, and means for activating one or more of said actuating means upon the determination by said determining means whether a predetermined number of said channel means have representations of conditions corresponding to predetermined conditions whereby said deactivating means deactivates said actuating means and said actuating means closes said valving means thereby stopping the flow of steam through said turbine system.

20. The system of claim 19, wherein said actuating means includes at least two independent means for rapidly closing said means for valving.

21. The system of claim 20, wherein said determining means includes means for detecting any discontinuity in the representation of turbine conditions such that any such malfunction is determined.

22. The system of claim 21, wherein said means for determining having a power supply, said means for determining includes means for detecting a failure in said power supply to said determining means thereby activating said means for deactivating said actuating means.

23. The system of claim 22, wherein said determining means includes number determining means which determines whether a predetermined number of channel means have representations of turbine conditions not corresponding to said predetermined conditions, whereby determination of said representations not corresponding to said predetermined conditions in any two of said measuring channel means causes deactivating means to deactivate said actuating means thereby closing said valving means and stopping the flow of steam through said turbine system.

24. The system of claim 23, wherein said number determining means includes means for generating said representations correspond to the turbine velocity and said predetermined conditions correspond to a predetermined rotational velocity.

25. The system of claim 24, wherein said channel means includes failure channel means and safety channel means whereby a safe condition representation exists in said safe channel means and a safe condition representation exists in said failure channel means whenever the rotational velocity of said turbine system does not exceed said predetermined rotational velocity.

26. The system of claim 25, wherein said deactuating means includes at least two independent means for rapidly closing said means for valving.

27. The system of claim 26, wherein said determining means includes means for detecting any discontinuity in the representation of turbine conditions such that any such malfunction is determined.

28. The system of claim 27, wherein said means for actuating said means for valving is operated by hydraulic fluid and said actuating means includes at least two dump valves associated with each of said actuating means,
    each dump valve being controlled by said deactivating means and actuating such that said hydraulic fluid is drained from said actuating means whereby said valving means is rapidly closed thereby stopping the flow of steam through said turbine system.

29. The system of claim 28, wherein said means for detecting any discontinuity includes delay means and comparator means whereby said discontinuity is detected by a comparison of a delayed representation of said rotational velocity of said turbine from said delay means differenced in said comparator means from the representation of said velocity without delay as related to a second predetermined rotational velocity limit.

30. The system defined in claim 29, wherein means are provided for testing the operation of said determining means by simulating the exceeding of said limits of said predetermined conditions such that none of said actuating means is deactivated by said deactivating means.

31. A nuclear electric power generation system comprising:
    a nuclear reactor;
    a steam turbine system having at least one high pressure and at least one low pressure turbine,
    a generator rotated by said turbine,
    breaker means connected between said turbine and an electrical load,
    valves for varying a flow of steam through said steam turbine system, hydraulically controlled actuators for operating said valves,
    means for controlling said actuators,
    first means for transducing the rotational velocity of said steam turbine into a first electrical signal,
    means connected to said first transducing means for feeding said first signal to said controlling means whereby said controlling means determines the position of said valves,
    second means for transducing the rotational velocity of said steam turbine into an electrical signal,
    said second transducing means having at least three signal channels,
    first determining means for checking a signal in said signal channels to determine whether a predetermined rotational velocity has been exceeded,
    second means for determining whether at least two of said channel signals do not fulfill specific predetermined conditions,
    third means including means for activating at least two dump valves connected to hydraulic cylinders in each of said hydraulic actuators for dumping hydraulic fluid whereby upon actuation of said dump valves said hydraulic actuators close said valves very rapidly.

32. The system as defined in claim 31, wherein said second means includes circuitry for translating at least three of said signal channels into at least two independent dump signal channels for activating said dump valves independently.

33. A method of preventing overspeeds in a steam turbine system resulting from partial or total load losses, said steam turbine system comprising governor valves for regulating a flow of steam through said turbine, actuators for actuating said valves, a first transducer and a second transducer for transducing the rotational velocity of said steam turbine into an electrical signal, said second transducer providing a plurality of independent speed signals, a signal channel for each speed signal, a check circuit included in each signal channel, control logic connected to said signal channels, two dumping signal channels including two separate dump valves connected to at least one of said actuators independently actuated and connected for dumping hydraulic fluid contained therein, including the steps of:
    transducing the speed of said turbine into three independent electrical signals;
    checking said signals against predetermined conditions;
    determining whether a predetermined number of said signals check against said predetermined conditions of the immediately preceding step.

34. The method of claim 33 including the additional step of:
    activating each of said dump valves upon determining whether a predetermined number of said signal channels do not correspond to said predetermined conditions.

35. The method as defined in claim 34 including the additional step of:
    dumping the hydraulic fluid from each of said hydraulic actuators.

36. The method as defined in claim 35 including the additional step of:
    actuating each of said separate dump valves on each of said actuators using an independent signal derived from said control logic.

37. The method as defined by claim 36 including the additional step of:
    testing each of said signal channels independently.

38. The method as defined by claim 37 including the additional step of:
    testing each dump valve channel separately.

39. An electric power generating system comprising:
    a steam turbine system having means for generating steam, at least one high pressure and at least one low pressure turbine, a generator rotated by said turbine,
    means for valving a flow of steam through said steam turbine system,
    means for actuating said valving means,
    first means for sensing the magnitude of the rotational velocity of said turbine system,
    means for controlling the position of said actuating means,
    means for connecting an output means of said first sensing means to an input means of said controlling means whereby a signal from said first sensing means corresponding to predetermined conditions actuates said controlling means,
    second means for sensing the magnitude of the rotational velocity of said steam turbine system,
    said second sensing means including at least a plurality of channel means,
    means for determining whether a predetermined number of said channel means have representations of turbine system conditions corresponding to predetermined conditions, and
    means for deactivating one or more of said actuating means upon the determination by said determining means whether a predetermined number of said channel means have representations of conditions corresponding to predetermined conditions whereby said deactivating means deactivates said actuating means and said actuating means closes said valving means thereby stopping the flow of steam through said turbine system.

40. The system of claim 39 wherein
said means for determining including second means for determining whether a predetermined number of channel means have representations of rotational velocity exceeding a predetermined rotational velocity limit.

41. The system of claim 40, wherein said channel means includes failure channel means and safety channel means whereby a safe condition representation exists in said safe channel means and a safe condition representation exists in said failure channel means whenever the rotational velocity of said turbine system does not exceed said predetermined rotational velocity.

42. The system of claim 41, wherein said actuating means includes at least two independent means for rapidly closing said means for valving.

43. The system of claim 42, wherein said determining means includes means for detecting any discontinuity in the representation of turbine conditions such that any such malfunction is determined.

44. The system of claim 43, wherein said means for determining has a power supply, said means for determining includes means for detecting a failure in said power supply to said determining means thereby activating said means for deactivating said actuating means.

45. The system of claim 44, wherein said determining means includes determining means which determines whether a predetermined number of channels means have representations of turbine conditions not corresponding to said predetermined conditions, whereby determinations of said representations not corresponding to said predetermined conditions in any two of said measuring channel means causes deactivating means to deactivate said actuating means thereby closing said valving means and stopping the flow of steam through said turbine system.

46. The system of claim 45, wherein said number determining means includes means for generating said representations correspond to the turbine velocity and said predetermined conditions correspond to a predetermined rotational velocity.

47. The system of claim 46, wherein said channel means includes failure channel means and safety channel means whereby a safe condition representation exists in said safe channel means and a safe condition representation exists in said failure channel means whenver the rotational velocity of said turbine system does not exceed said predetermined rotational velocity.

48. The system of claim 47, wherein said deactuating means includes at least two independent means for rapidly closing said means for valving.

49. The system of claim 48, wherein said determining means includes means for detecting any discontinuity in the representation of turbine conditions such that any such malfunction is determined.

50. The system of claim 49, wherein said means for actuating said means for valving is operated by hydraulic fluid and said actuating means includes at least two dump valves associated with each of said actuating means,
each dump valve being controlled by said deactivating means and actuating such that said hydraulic fluid is drained from said actuating means whereby said valving means is rapidly closed thereby stopping the flow of steam through said turbine system.

51. The system of claim 50, wherein said means for detecting any discontinuity includes delay means and comparator means whereby said discontinuity is detected by a comparison of a delayed representation of said rotational velocity of said turbine from said delay means differenced in said comparator means from the representation of said velocity without delay as related to a second predetermined rotational velocity limit.

52. The system defined in claim 51, wherein means are provided for testing the operation of said determining means by simulating the exceeding of said limits of said predetermined conditions such that none of said actuating means is activated by said deactuating means.

53. A nuclear electric power generation system comprising:
a nuclear reactor;
a steam turbine system having at least one high pressure and at least one low pressure turbine,
a generator rotated by said turbine,
valves for varying a flow of steam through said steam turbine system, hydraulically controlled actuators for operating said valves,
breaker means connected between said turbine and an electrical load,
means connecting to and determining the state of said breaker means to said controlling means,
means for determining a flow of electrical energy from said generator to said electrical load,
means connecting said energy flow determining means to said controlling means, whereby a representation of said flow of electrical energy and state of said breaker are acted upon by said controlling means for determining a desired position of said valves,
means for transducing the rotational velocity of said steam turbine system into an electrical signal,
said transducing means having at least three signal channels,
first determining means for checking a signal in said signal channels to determine whether a predetermined rotational velocity has been exceeded,
second means for determining whether at least two of said channel signals do not fulfill specific predetermined conditions,
third means including means for activating at least two dump valves connected to hydraulic cylinders in each of said hydraulic actuators for dumping hydrauilc fluid whereby upon actuation of said dump valves said hydraulic actuators close said valves very rapidly.

54. The system as defined in claim 53, wherein said second means includes circuitry for translating at least three of said signal channels into at least two independent dump signal channels for activating said dump valves independently.

55. The system as defined in claim 54, wherein said controlling means comprises a digital computer having analog to digital input capabilities and digital to analog output capabilities.

56. An electric power generating system comprising:
a steam turbine system having means for generating steam at least one high pressure and at least one low pressure turbine,
a generator rotated by said turbine,
an electric load connected to said generator,
means for valving a flow of steam through said steam turbine,
means for actuating said valving means,
first means for sensing the magnitude of the rotational velocity of said steam turbine system,
means for measuring the magnitude of the flow of energy from said generator to said electric load,
means for measuring a pressure of said steam in said steam turbine system,
means for controlling said actuating means whereby a position of said valving means is controlled,
means for determining a position of said valving means including means for computing a desired valve position,
means connecting said first means for sensing the magnitude of rotational velocity of said turbine system to said computing means,
means for connecting said rotational velocity sensing means to said computing means,
means connecting said energy flow measuring means to said computing means,
means connecting said pressure measuring means to said computing means,
said controlling means moving said valving means in a direction and to a position determined by said computing means upon the receipt of signals by said computing means, from said first rotational sensing means and from said electric energy flow measuring means, and said pressure measuring means, whereby said direction of motion and said position of said valve means is determined during the start-up, the synchronization and the power generation phases of said electric power generating system,
second means for sensing the magnitude of the rotational velocity of said steam turbine system,
said second sensing means including a plurality of channel means,
means for determining whether a predetermined number of said channel means have representations of turbine system conditions corresponding to predetermined conditions,
said means for determining including second means for determining whether a predetermined number of channel means have representations of rotational velocity exceeding a predetermined rotational velocity limit,
said channel means including failure channel means and safety channel means whereby a safe condition representation exists in said safe channel means and a safe condition representation exists in said failure channel means whenever the rotational velocity of said turbine system does not exceed said predetermined rotational velocity, and
means for deactivating one or more of said actuating means upon the determination by said determining means whether a predetermined number of said channel means have representations of conditions corresponding to predetermined conditions whereby said deactivating means deactivates said actuating means and said actuating means closes said valving means thereby stopping the flow of steam through said turbine system.

57. The system of claim 56, wherein said actuating means includes at least two independent means for rapidly closing said valving means.

58. The system of claim 57, wherein said determining means includes means for detecting any discontinuity in the representation of turbine conditions such that any such malfunction is determined.

59. The system of claim 58, wherein said means for determining has a power supply, said means for determining includes means for detecting a failure in said power supply to said determining means thereby activating said means for deactivating said actuating means.

60. The system of claim 59, wherein said deactivating means includes at least two independent means for rapidly closing said valving means.

61. The system of claim 60, wherein said determining means includes means for detecting any discontinuity in the representation of turbine conditions such that any such malfunction is determined.

62. The system of claim 61, wherein said means for actuating said means for valving is operated by hydraulic fluid and said actuating means includes at least two dump valves associated with each of said actuating means,
each dump valve being controlled by said deactivating means and actuating such that said hydraulic fluid is drained from said actuating means whereby said valving means is rapidly closed thereby stopping the flow of steam through said turbine system.

63. The system of claim 62, wherein said means for detecting any discontinuity includes delay means and comparator means whereby said discontinuity is detected by a comparison of a delayed representation of said rotational velocity of said turbine from said delay means differenced in said comparator means from the representation of said velocity without delay as related to a second predetermined rotational velocity limit.

64. The system defined in claim 63, wherein means are provided for testing the operation of said determining means by simulating the exceeding of said limits of said predetermined conditions such that none of said actuating means is activated by said deactivating means.

* * * * *